US011995497B1

(12) United States Patent
Kwon et al.

(10) Patent No.: US 11,995,497 B1
(45) Date of Patent: May 28, 2024

(54) METHOD OF DETECTING MAGNETIZATION SIGNAL OF PHYSICALLY UNCLONABLE FUNCTIONS DEVICE AND MAGNETIZATION SIGNAL DETECTION SENSOR

(71) Applicants: Hyundai Motor Company, Seoul (KR); Kia Corporation, Seoul (KR)

(72) Inventors: Joon-Hyun Kwon, Hwaseong-si (KR); Ji-Sung Lee, Suwon-si (KR); Han-Saem Lee, Seoul (KR); Su-Jung Noh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/299,533

(22) Filed: Apr. 12, 2023

(30) Foreign Application Priority Data

Jan. 9, 2023 (KR) .......................... 10-2023-0003090

(51) Int. Cl.
*G06K 7/08* (2006.01)
*H04L 9/32* (2006.01)

(52) U.S. Cl.
CPC ............ *G06K 7/087* (2013.01); *H04L 9/3278* (2013.01)

(58) Field of Classification Search
CPC ............................. G06K 7/087; H04L 9/3278

USPC ......................................................... 235/449
See application file for complete search history.

(56) References Cited

U.S. PATENT DOCUMENTS

| 10,127,956 | B2 | 11/2018 | Lee et al. |
| 10,434,812 | B2 | 10/2019 | Cape et al. |
| 2018/0149775 | A1 | 5/2018 | Power |
| 2018/0229536 | A1 | 8/2018 | Gettens et al. |
| 2019/0190725 | A1* | 6/2019 | De ........................... G09C 1/00 |
| 2022/0069990 | A1* | 3/2022 | Ryckman ................. G01B 1/00 |
| 2024/0015033 | A1* | 1/2024 | Davies .................. H04L 9/0866 |
| 2024/0054841 | A1* | 2/2024 | Skrabalak ............ G07D 7/2033 |

FOREIGN PATENT DOCUMENTS

| KR | 20160133821 A | 11/2016 |
| KR | 20160138190 A | 12/2016 |
| KR | 20190111076 A | 10/2019 |

* cited by examiner

*Primary Examiner* — Daniel A Hess
(74) *Attorney, Agent, or Firm* — SLATER MATSIL, LLP

(57) ABSTRACT

The present disclosure provides a method of detecting a magnetization signal of a physically unclonable functions (PUF) device including acquiring, by a magnetization signal detection sensor, an image of a magnetic layer of the PUF device including the magnetic layer having a perpendicular magnetization component and identifying a magnetization state of the magnetic layer from the image of the magnetic layer acquired by the magnetization signal detection sensor, and according to the present disclosure, it is possible to more efficiently check the magnetization signal of the PUF device and acquire a random unique ID according to magnetization.

17 Claims, 8 Drawing Sheets

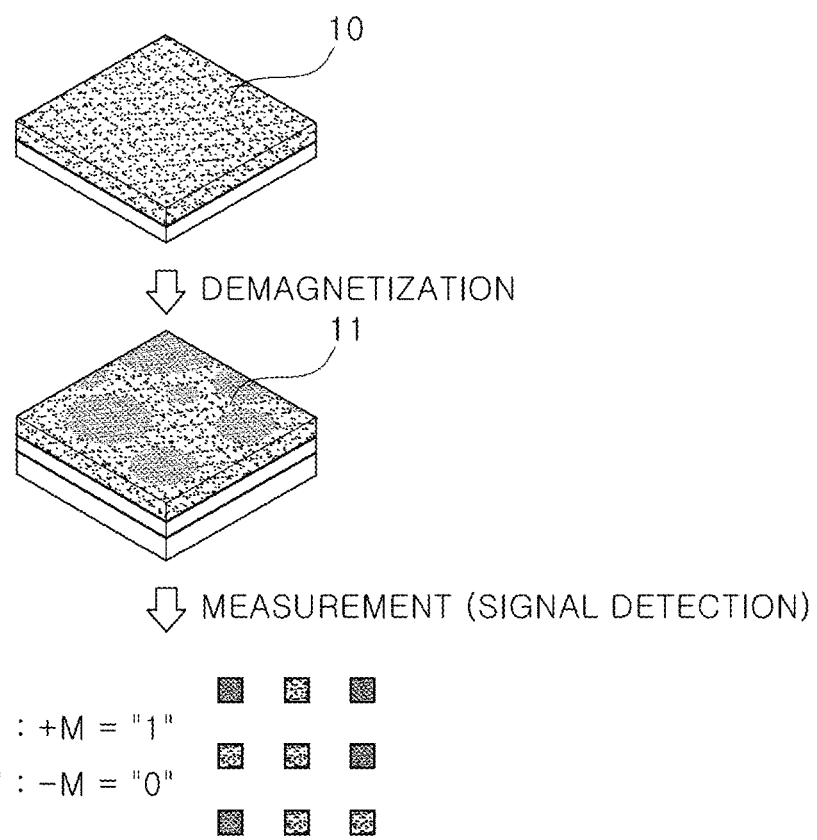

METHOD OF DETECTING MAGNETIZATION SIGNAL OF PHYSICALLY UNCLONABLE FUNCTIONS DEVICE AND MAGNETIZATION SIGNAL DETECTION SENSOR

CROSS-REFERENCE TO RELATED APPLICATIONS

This application claims priority to Korean Patent Application No. 10-2023-0003090, filed on Jan. 9, 2023, which is incorporated herein by reference in its entirety.

TECHNICAL FIELD

The present disclosure relates to a method of checking a magnetization state of a physically unclonable functions (PUF) device through optical measurement and a sensor therefor.

BACKGROUND

With the development of a semiconductor technology and an information and communication technology, semiconductor devices for information security are being developed, and physically unclonable functions (PUF) devices are part of such a security solution.

Conventional PUF devices have a technology of utilizing an electrical conduction difference (open-circuit or short-circuit) due to process errors occurring in a process of manufacturing via holes between metal layers in a semiconductor structure and have a technology of utilizing the random magnetic anisotropy caused by the heterogeneous etching of an uppermost layer of a multi-layer thin film structure having perpendicular magnetic anisotropy.

In order to manufacture the conventional PUF devices, a semiconductor process is essential, an array process through a cleaning process, a photoresist (PR) applying process, a photolithography process, an etching process, and a lift-off/PR removal process and a process for deviceization are required. In order to check a magnetization state of the PUF device manufactured as described above, a binary signal needs to be identified by a difference in output voltages or polarities due to a magnetization switching difference according to a magnetization direction when a current is applied.

The contents described in Background are to help the understanding of the background of the present disclosure, and may include what is not previously known to those skilled in the art to which the present disclosure pertains.

SUMMARY

The present disclosure has been made in efforts to solve the above problems, and the present disclosure is directed to providing a method of detecting a magnetization signal of a physically unclonable functions (PUF) device capable of acquiring a random unique ID according to magnetization by more efficiently checking the magnetization signal of the PUF device and a magnetization signal detection sensor.

A method of detecting a magnetization signal of a physically unclonable functions (PUF) device according to one aspect of the present disclosure includes acquiring, by a magnetization signal detection sensor, an image of a magnetic layer of the PUF device including the magnetic layer having a perpendicular magnetization component and identifying a magnetization state of the magnetic layer from the image of the magnetic layer acquired by the magnetization signal detection sensor.

In addition, the identifying of the magnetization state may identify the magnetization state from a contrast of the image of the magnetic layer generated by a polarization difference between incident light and reflected light by the magnetization signal detection sensor.

In addition, the identifying of the magnetization state may binarize the magnetization state of the magnetic layer by the comparison of the contrast of the image of the magnetic layer.

Here, the magnetic layer of the PUF device may have a magnetization state that is randomly distributed through a demagnetization process.

In addition, the demagnetization process may perform demagnetization by alternately applying a magnetic field in a direction opposite to a forward direction to the PUF device and applying the magnetic force while sequentially reducing a magnitude of the magnetic force in a state in which the PUF device is heated to a Curie temperature or higher.

Meanwhile, the magnetization signal detection sensor may include a light guide, a light source disposed on one side of the light guide, a lens disposed on the other side of the light guide, an incident optical path and a reflection optical path separately formed in the light guide, a first polarizer provided on the incident optical path, a second polarizer provided on the reflection optical path, and a photodetector configured to detect light introduced through the reflection optical path.

In addition, a difference in polarization angles of the first polarizer and the second polarizer may be 45 degrees.

Next, a magnetization signal detection sensor of a PUF device according to one aspect of the present disclosure as a sensor configured to detect an image of a magnetic layer of a PUF device including the magnetic layer having a perpendicular magnetization component includes a light guide, a light source disposed on one side of the light guide, a lens disposed on the other side of the light guide, an incident optical path and a reflection optical path separately formed in the optical guide, a first polarizer provided on the incident optical path, a second polarizer provided on the reflection optical path, and a photodetector configured to detect light introduced through the reflection optical path.

In addition, polarization directions of the first polarizer and the second polarizer may be different.

Furthermore, a difference in polarization angles of the first polarizer and the second polarizer may be 45 degrees.

According to the method of detecting the magnetization signal of the PUF device according to the present disclosure, it is possible to acquire the random unique ID according to magnetization by more efficiently checking the magnetization signal of the PUF device without the conventional processes.

BRIEF DESCRIPTION OF THE DRAWINGS

FIG. 8 shows a method of detecting the magnetization signal of the PUF device according to the present disclosure.

DETAILED DESCRIPTION OF ILLUSTRATIVE EMBODIMENTS

In order to fully understand the present disclosure and the operational advantages of the present disclosure and the objects achieved by the practice of the present disclosure, reference should be made to the accompanying drawings showing preferred embodiments of the present disclosure and the contents described in the accompanying drawings.

In describing the preferred embodiments of the present disclosure, known techniques or repetitive descriptions that may unnecessarily obscure the subject matter of the present disclosure will be reduced or omitted.

Figure 1:
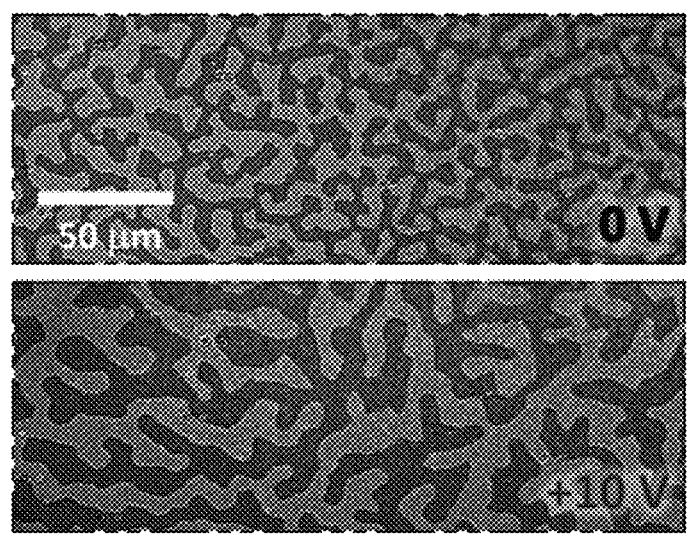
FIG. 1 is a magnetic domain image of a magnetic thin film having perpendicular magnetic anisotropy.
Figure 2:
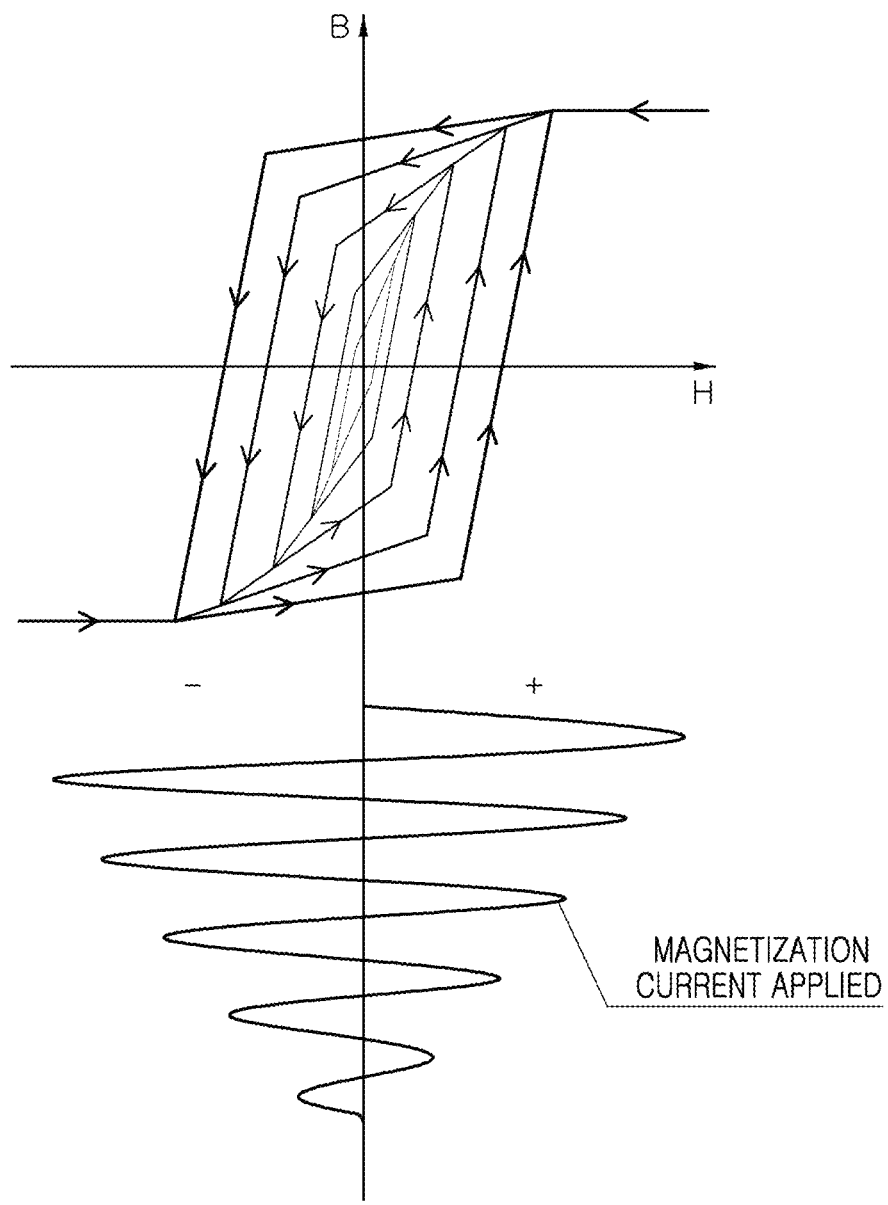
FIG. 2 shows random magnetization formation of a magnetic substance.

FIG. 1 is a magnetic domain image of a magnetic thin film having perpendicular magnetic anisotropy, and FIG. 2 shows random magnetization formation of a magnetic substance.

The magnetic domain is the smallest unit area having the same magnetization in a magnetic substance and in general, a material having perpendicular magnetic anisotropy has a perpendicular magnetization component in a direction perpendicular to a plane.

FIG. 1 is a magnetic thin film having basic perpendicular magnetization made of Pt/Co/MgO and is an image photographed by using a magneto-optical Kerr effect (MOKE) microscope.

The MOKE photographed images of the perpendicular magnetization are in the form of repetitive bands, and the present disclosure is applicable to all magnetic thin films having perpendicular magnetization.

As an example of a structure having perpendicular magnetization, an $L1_0$ structure through a heavy metal/ferromagnet junction is representative, and in addition, there are a ferrimagnet material using a rare earth metal/transition metal junction structure and the like.

As a method of randomly forming a magnetic substance, there is a demagnetization method. In the case of a ferromagnetic substance, an external magnetic field that is higher than or equal to a magnetic field generated by spontaneous magnetization is applied thereto in a state in which the ferromagnetic substance is heated to room temperature or a Curie temperature or higher at which ferromagnetic properties are lost. Thereafter, magnetic fields having a positive polarity and a negative polarity are applied at a certain cycle, and at this time, as shown in FIG. 2, since an intensity is weakened to a certain magnitude, the above procedure is performed until the external magnetic field finally becomes zero.

When the demagnetization process is performed, a magnetic domain having magnetization in a random direction may be formed in the magnetic substance, and thus the magnetic substance has random magnetization characteristics. In addition, even when the demagnetization process is repeated in the same magnetic substance, a different demagnetization state is shown whenever the process is performed.

Figure 3:
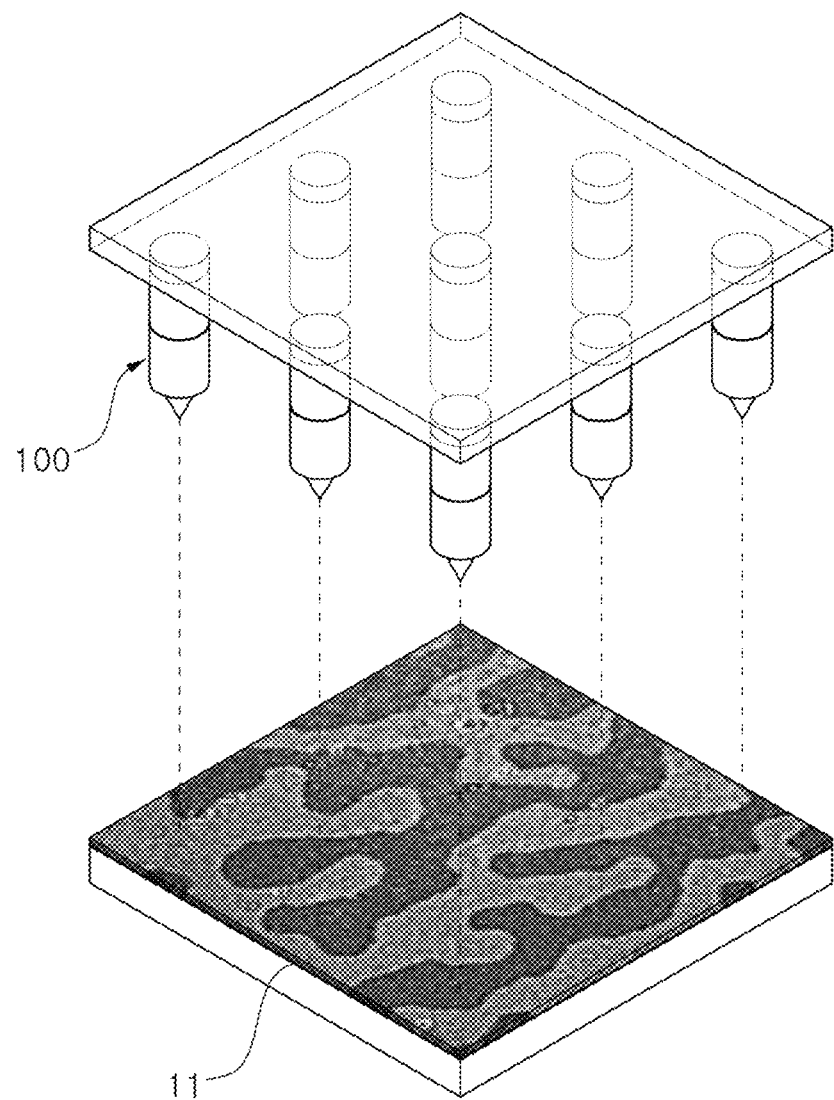
FIG. 3 shows a method of detecting a magnetization signal of a physically unclonable functions (PUF) device according to the present disclosure.

The present disclosure provides a method of detecting a magnetization distribution state of the magnetic thin film having perpendicular magnetization. Furthermore, the present disclosure provides a method of detecting a magnetization distribution state of the a magnetic thin film having random magnetization direction by demagnetization through an optical method. FIG. 3 shows that a magnetization signal of the PUF device including a demagnetized magnetic layer 11 is detected using a plurality of magnetization signal detection sensors 100.

Figure 4:
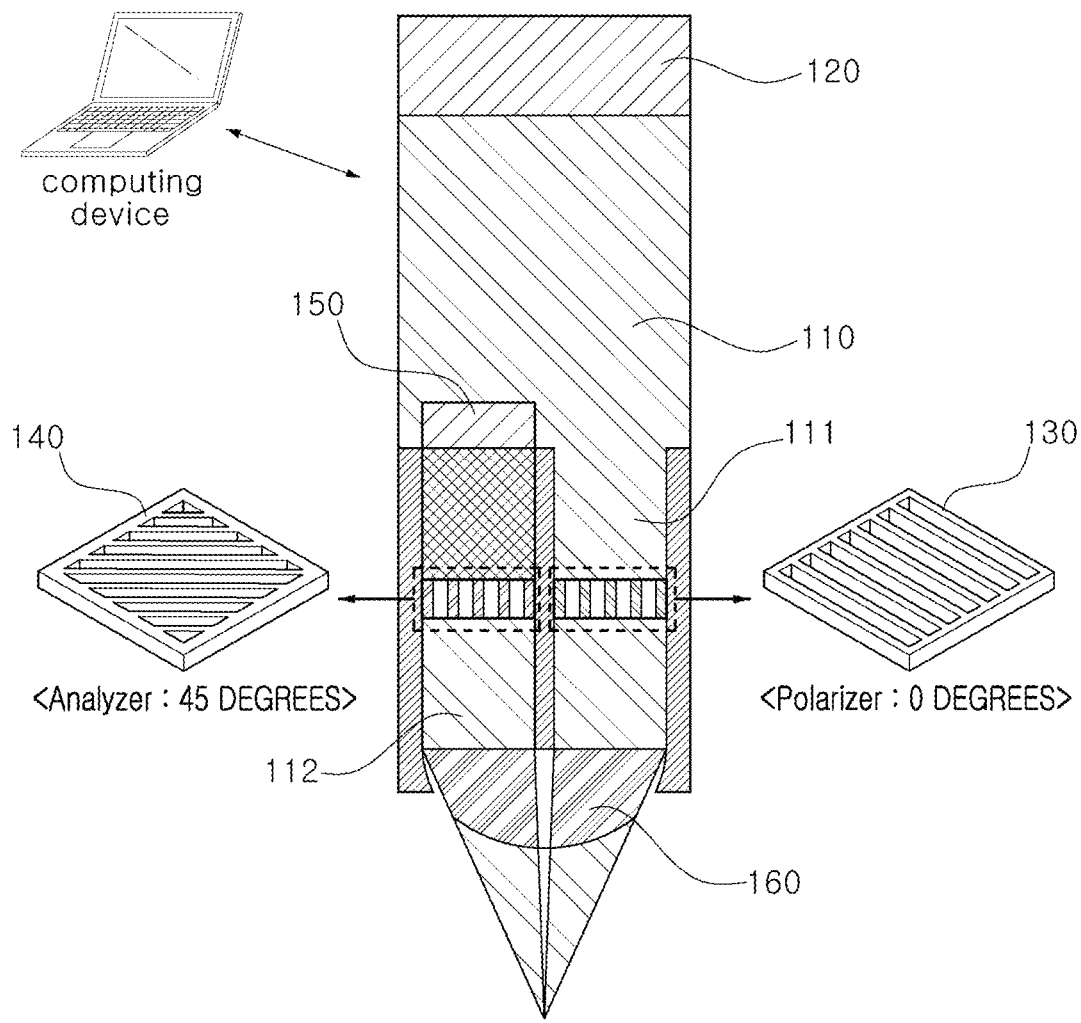
FIG. 4 shows a magnetization signal detection sensor of the PUF device according to the present disclosure in more detail.

FIG. 4 shows a cross-sectional shape of the individual magnetization signal detection sensor 100, wherein the magnetization signal detection sensor 100 includes a light guide 110, a light source 120, a photodetector 150, and a lens 160. The light guide 110 is formed by dividing an incident optical path in and a reflection optical path 112, a first polarizer 130 is disposed on the incident optical path in, and a second polarizer 140 is disposed on the reflection optical path 112.

As the light source 120, a general MOKE applied light source may be applied, a mercury or xenon lamp or a laser may be used, and a short-wavelength high-output light emitting diode (LED) lamp for miniaturization may be applied.

The photodetector 150 is a photodiode, and the lens 160 is a micro lens. Since a magnetic domain size of a magnetic thin film having random magnetization, particularly, random perpendicular magnetization ranges from several lam to several tens of lam, a size of the micro lens of an image sensor for the focusing of the light source for detecting the size of the magnetic domain is preferably limited to several tens of lam to hundreds of lam.

The light generated by the light source 120 is incident on the demagnetized magnetic layer 11 through the first polarizer 130 via the incident optical path in, and the light reflected from the demagnetized magnetic layer 11 enters the photodetector 150 through the second polarizer 140 via the reflection optical path 112.

Polarization directions of the first polarizer 130 and the second polarizer 140 are different. In some embodiments, a polarization angle of the second polarizer 140 is 45 degrees when a polarization angle of the first polarizer 130 is zero degrees. In these embodiments, the first polarizer becomes a polarizer, and the second polarizer becomes an analyzer.

According to the present disclosure, a contrast image of the magnetic layer is acquired through a polarization difference between the incident light and the reflected light as described above by a magnetization state detecting apparatus such as a computing device, and the magnetization state is detected from the contrast image of the magnetic layer by the magnetization state detecting apparatus.

Figure 5:
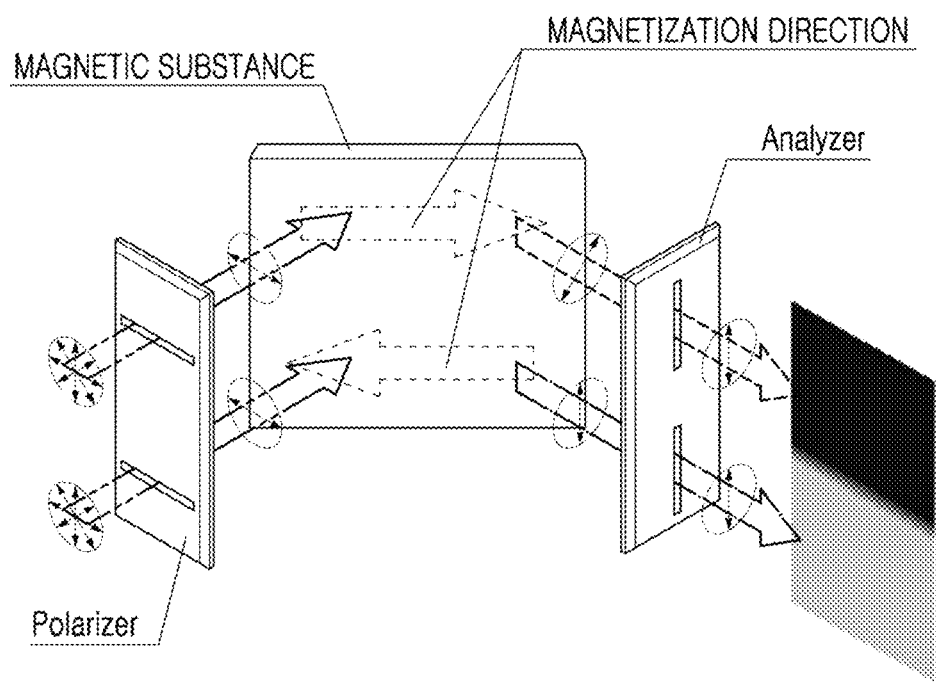
FIG. 5 shows an magneto-optical Kerr effect.

This uses the MOKE and uses a phenomenon and effect in which the difference between the incident light and the reflected light occurs according to the magnetization state of the material on a surface of an object in which the polarized light is magnetized as shown in FIG. 5.

The relative magnetization of the material can be checked through the contrast of the image acquired as described above.

As in the previous example of the present disclosure, the incident light and the reflected light pass through the polarizers having different angles. At this time, the first polarizer 130 through which the incident light passes becomes the polarizer, and the second polarizer 140 through which the reflected light passes becomes the analyzer. Each polarizer may be manufactured in a size of several lam through a micro-electro mechanical systems (MEMS) process.

A signal may be read by the reflected light through the photodetector (photodiode), and the signal may be binarized because a clear difference in brightness or contrast is shown by the MOKE according to each magnetic domain.

Therefore, when a magnetization signal of random magnetic domains randomly distributed over the entire surface of the magnetic substance is read using the MOKE image sensor, a random unique ID according to magnetization may be acquired like another spintronic applied PUF.

Figure 6:
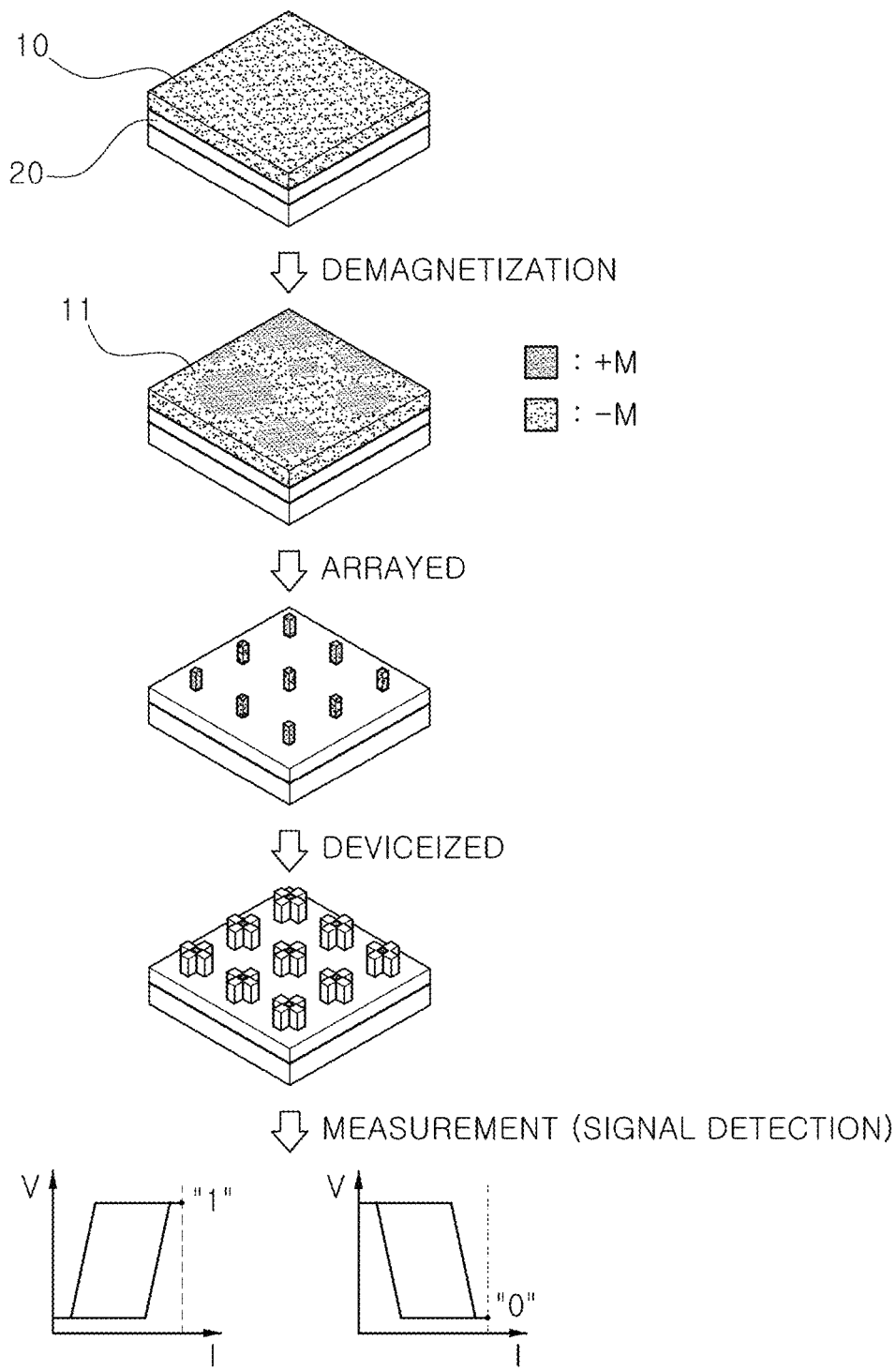
FIG. 6 shows a method of detecting a magnetization signal of a conventional PUF device.
Figure 7:
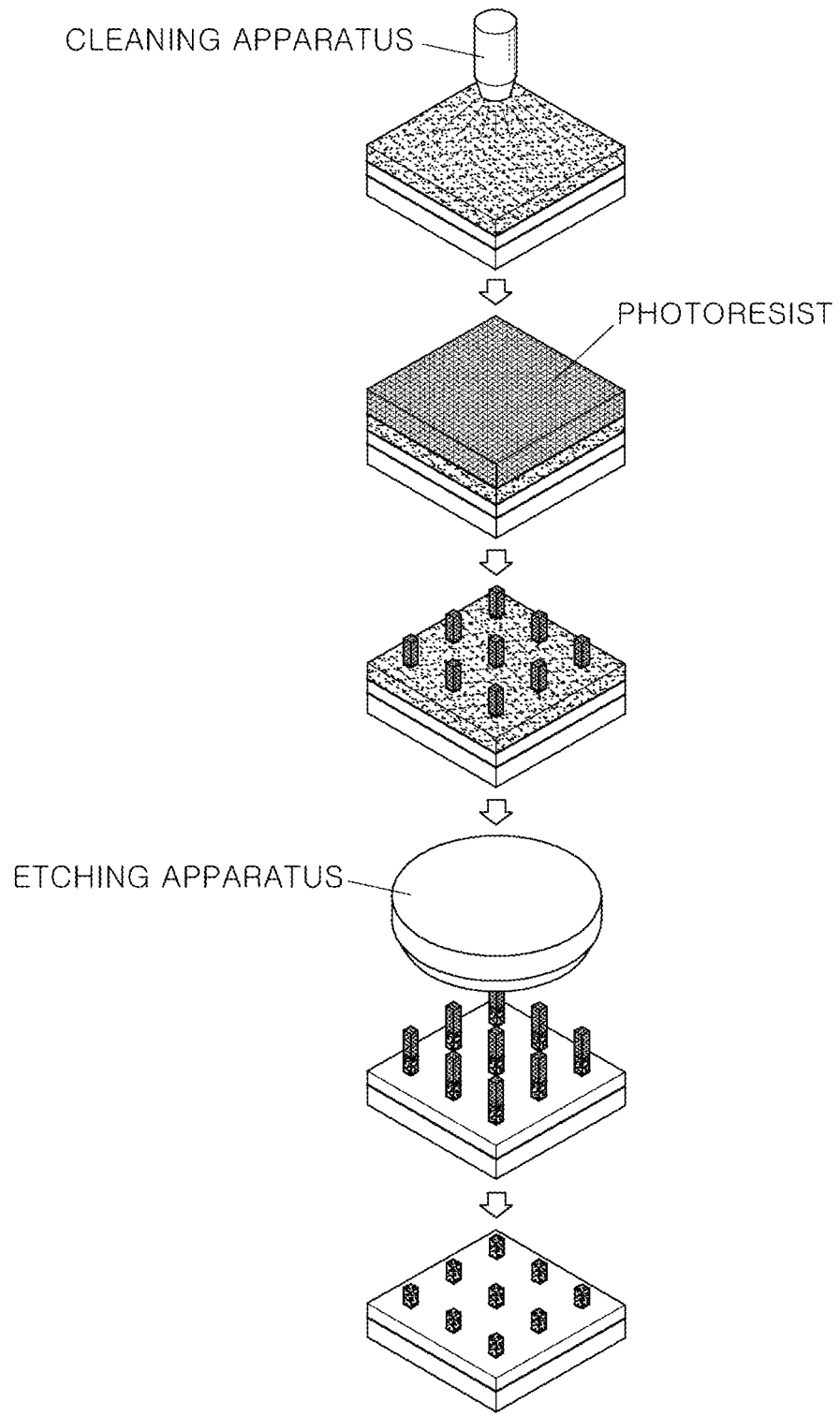
FIG. 7 shows a detailed process of manufacturing the conventional PUF device.

FIG. 6 shows a method of detecting a magnetization signal of a conventional PUF device, and FIG. 7 shows a detailed process of manufacturing the conventional PUF device.

The magnetic layer 10 on a channel layer 20 is demagnetized, then arrayed, and then deviceized, and the binary signal is identified by the difference in output voltages or polarities due to the magnetization switching difference according to the magnetization direction when the current is applied to the device.

In order to manufacture an array and a device, a semiconductor process is essential, the following processes are required at a minimum, and the following processes as shown in FIG. 7 are sequentially performed.

Cleaning process: a process of removing impurities on a surface of a substrate or a specimen by physical/chemical methods.

Photoresist applying process: a process of applying photoresist (PR) for a photolithography (patterning) process.

Photolithography process: a process of drawing designed patterns on the substrate or the specimen using light and then forming patterns through a developing process.

Etching process: an etching process using physical/chemical methods in order to leave a patterned shape on the substrate or the specimen.

Lift-off/PR removal process: a process of removing PR and unnecessary residual layers remaining after a final patterning is performed.

On the other hand, referring to FIG. 8, a method of detecting the magnetization signal of the PUF device according to the present disclosure is shown. In FIG. 8, the magnetic layer 10 of the PUF device including the magnetic layer 10 having perpendicular magnetization is demagnetized and a front image of the demagnetized magnetic layer 11 is acquired using the magnetization signal detection sensor 100 by a magnetization state detecting apparatus such as a computing device according to the present disclosure (detecting).

The polarization angles of the incident optical path and the reflection optical path of the magnetization signal detection sensor 100 cause the difference in the contrast of the incident light and the reflected light, and the magnetization of the magnetic layer is identified through the contrast of the image acquired as described above by the magnetization state detecting apparatus (judging).

Furthermore, the magnetization of the magnetic layer is binarized by the comparison of the contrast.

As described above, according to the present disclosure, by easily detecting the magnetization direction of the magnetic substance having perpendicular magnetization even without the conventional process, it is possible to more efficiently check the magnetization signal of the PUF device and acquire the random unique ID according to magnetization.

The present disclosure has been described above with reference to the exemplary drawings, but is not limited to the described embodiments, and it is apparent to those skilled in the art that the present disclosure may be variously modified and changed without departing from the spirit and scope of the present disclosure. Therefore, these modified examples or changed examples should belong to the claims of the present disclosure, and the scope of the present disclosure should be construed on the basis of the appended claims.

What is claimed is:

1. A method of detecting a magnetization signal of a physically unclonable functions (PUF) device, comprising:
acquiring, by a magnetization signal detection sensor, an image of a magnetic layer of the PUF device including the magnetic layer having a perpendicular magnetization component; and
identifying, by a magnetization state detecting apparatus, a magnetization state of the magnetic layer from the image of the magnetic layer acquired by the magnetization signal detection sensor.

2. The method of claim 1, wherein the identifying of the magnetization state identifies the magnetization state from a contrast of the image of the magnetic layer generated by a polarization difference between incident light and reflected light by the magnetization signal detection sensor.

3. The method of claim 2, wherein the identifying of the magnetization state binarizes the magnetization state of the magnetic layer by a comparison of the contrast of the image of the magnetic layer.

4. The method of claim 3, wherein the magnetic layer of the PUF device has a magnetization state that is randomly distributed through a demagnetization process.

5. The method of claim 4, wherein the demagnetization process performs demagnetization by alternately applying a magnetic field in a direction opposite to a forward direction to the PUF device and applying the magnetic force while sequentially reducing a magnitude of the magnetic force in a state in which the PUF device is heated to a Curie temperature or higher.

6. The method of claim 4, wherein the magnetization signal detection sensor includes a light guide, a light source disposed on one side of the light guide, a lens disposed on the other side of the light guide, an incident optical path and a reflection optical path separately formed in the light guide, a first polarizer provided on the incident optical path, a second polarizer provided on the reflection optical path, and a photodetector configured to detect light introduced through the reflection optical path.

7. The method of claim 6, wherein a difference in polarization angles of the first polarizer and the second polarizer is 45 degrees.

8. A magnetization signal detection sensor of a physically unclonable functions (PUF) device configured to detect an image of a magnetic layer of a PUF device including the magnetic layer having a perpendicular magnetization component, comprising:
a light guide;
a light source disposed on one side of the light guide;
a lens disposed on the other side of the light guide;
an incident optical path and a reflection optical path separately formed in the optical guide;
a first polarizer provided on the incident optical path;
a second polarizer provided on the reflection optical path; and
a photodetector configured to detect light introduced through the reflection optical path.

9. The magnetization signal detection sensor of claim 8, wherein polarization directions of the first polarizer and the second polarizer are different.

10. The magnetization signal detection sensor of claim 8, wherein a difference in polarization angles of the first polarizer and the second polarizer is 45 degrees.

11. The magnetization signal detection sensor of claim 8, wherein the magnetic layer of the PUF device has a magnetization state that is randomly distributed through a demagnetization process.

12. A method of detecting a magnetization signal of a physically unclonable functions (PUF) device, comprising:
acquiring, by a magnetization signal detection sensor, an image of a magnetic layer of the PUF device including the magnetic layer having a perpendicular magnetization component;
generating a contrast of the image of the magnetic layer by a polarization difference between incident light and reflected light by the magnetization signal detection sensor;
binarizing the magnetization state of the magnetic layer by a comparison of the contrast of the image of the magnetic layer; and
identifying a magnetization state of the magnetic layer based on the binarized magnetization state of the magnetic layer.

13. The method of claim 12, wherein the magnetic layer of the PUF device has a magnetization state that is randomly distributed through a demagnetization process.

14. The method of claim 13, wherein the demagnetization process performs demagnetization by alternately applying a magnetic field in a direction opposite to a forward direction to the PUF device and applying the magnetic force while sequentially reducing a magnitude of the magnetic force in a state in which the PUF device is heated to a Curie temperature or higher.

15. The method of claim 12, wherein the magnetization signal detection sensor includes a light guide, a light source disposed on one side of the light guide, a lens disposed on the other side of the light guide, an incident optical path and a reflection optical path separately formed in the light guide, a first polarizer provided on the incident optical path, a second polarizer provided on the reflection optical path, and a photodetector configured to detect light introduced through the reflection optical path.

16. The method of claim 15, wherein polarization directions of the first polarizer and the second polarizer are different.

17. The method of claim 15, wherein a difference in polarization angles of the first polarizer and the second polarizer is 45 degrees.

* * * * *